US011119659B2

(12) United States Patent
Cariello

(10) Patent No.: US 11,119,659 B2
(45) Date of Patent: Sep. 14, 2021

(54) WRITE BUFFER IMPLEMENTATION FOR MULTIPLE MEMORY ARRAY MEMORY SPACES

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 22 days.

(21) Appl. No.: 16/538,426

(22) Filed: Aug. 12, 2019

(65) Prior Publication Data

US 2021/0048952 A1 Feb. 18, 2021

(51) Int. Cl.
*G06F 3/06* (2006.01)

(52) U.S. Cl.
CPC ............ *G06F 3/0613* (2013.01); *G06F 3/068* (2013.01); *G06F 3/0656* (2013.01)

(58) Field of Classification Search
CPC ...... G06F 3/0613; G06F 3/0656; G06F 3/068; G06F 11/2094; G06F 11/20; G06F 11/1068
See application file for complete search history.

(56) References Cited

U.S. PATENT DOCUMENTS

| | | | | |
|---|---|---|---|---|
| 2011/0252187 A1* | 10/2011 | Segal | G06F 12/0246 | 711/103 |
| 2013/0219109 A1* | 8/2013 | Kim | G11C 11/5628 | 711/103 |
| 2014/0006688 A1* | 1/2014 | Yu | G06F 12/0246 | 711/103 |
| 2014/0101372 A1* | 4/2014 | Jung | G11C 16/26 | 711/103 |
| 2016/0141026 A1* | 5/2016 | Lee | G11C 16/10 | 365/185.03 |
| 2017/0102991 A1* | 4/2017 | Haratsch | H03M 13/3707 | |
| 2018/0211708 A1* | 7/2018 | Igahara | G06F 3/0679 | |
| 2019/0121691 A1* | 4/2019 | Tao | G11C 29/028 | |
| 2020/0393995 A1* | 12/2020 | Jung | G06F 3/061 | |

* cited by examiner

*Primary Examiner* — Andrew J Cheong
(74) *Attorney, Agent, or Firm* — Schwegman Lundberg & Woessner, P.A.

(57) ABSTRACT

A memory device comprises a memory array including memory cells programmable as single level memory cells (SLCs) and memory cells programmable as triple level memory cells (TLCs); a memory control unit operatively coupled to the memory array and including a processor, the processor configured to program the memory cells with SLC data and TLC data; and a write buffer to buffer data for writing to the memory array, the write buffer including both SLC data memory space and TLC data memory space, wherein the memory control unit is configured to store TLC data in the SLC data memory space when there is overflow of the TLC data memory space.

21 Claims, 9 Drawing Sheets

| Memory Cell 210, 285 | | | |
|---|---|---|---|
| | B2 | B1 | B0 |
| $Vt_7$ | 1 | 1 | 1 |
| $Vt_6$ | 1 | 1 | 0 |
| $Vt_5$ | 1 | 0 | 1 |
| $Vt_4$ | 1 | 0 | 0 |
| $Vt_3$ | 0 | 1 | 1 |
| $Vt_2$ | 0 | 1 | 0 |
| $Vt_1$ | 0 | 0 | 1 |
| $Vt_0$ | 0 | 0 | 0 |

WRITE BUFFER IMPLEMENTATION FOR MULTIPLE MEMORY ARRAY MEMORY SPACES

BACKGROUND

Memory devices are typically provided as internal, semiconductor, integrated circuits in computers or other electronic devices. There are many different types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory cells are typically arranged in a matrix or an array. Multiple matrices or arrays can be combined into a memory device, and multiple devices can be combined to form a storage volume of a memory system, such as a solid-state drive (SSD), a Universal Flash Storage (UFS™) device, a MultiMediaCard (MMC) solid-state storage device, an embedded MMC device (eMMC™), etc.

A memory system can include one or more processors or other memory controllers performing logic functions to operate the memory devices or interface with external systems. The memory matrices or arrays can include a number of blocks of memory cells organized into a number of physical pages. The memory system can receive commands from a host in association with memory operations, such as read or write operations to transfer data (e.g., user data and associated integrity data, such as error data and address data, etc.) between the memory devices and the host, erase operations to erase data from the memory devices, or perform one or more other memory operations.

Memory is utilized as volatile and non-volatile data storage for a wide range of electronic applications, including, for example, personal computers, portable memory sticks, digital cameras, cellular telephones, portable music players such as MP3 players, movie players, and other electronic devices. Memory cells can be arranged into arrays, with the arrays being used in memory devices.

Many electronic devices include several main components: a host processor (e.g., a central processing unit (CPU) or other main processor); main memory (e.g., one or more volatile or non-volatile memory device, such as dynamic RAM (DRAM), static RAM (SRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, or combination of volatile and non-volatile memory, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Memory devices, particularly NVM devices, such as NAND flash devices, etc., can include arrays of multi-level memory cells. To program multi-level memory cells, a memory page buffer or write buffer is stored with the value to be written to the memory cells. This write buffer may be filled by a memory controller or memory control unit using data received from a host device. A first programming pulse is applied to the control gate of the memory cell at a voltage level that should not cause the threshold voltage of the memory cell to exceed the lowest threshold voltage of a target programmed data state of a multi-level memory cell. A read operation can then be performed to verify the threshold level to which the cell is programmed. If the cell is not programmed to the desired threshold voltage, an additional programming pulse, including optionally a higher voltage or longer length pulse, is applied and the threshold voltage is rechecked. This process is repeated until the read operation confirms that the memory cell is programmed to the desired threshold voltage. In efforts to improve throughput to the memory array, the data path from the host device to the write buffer to the memory array may become restrictive.

Figure 1:
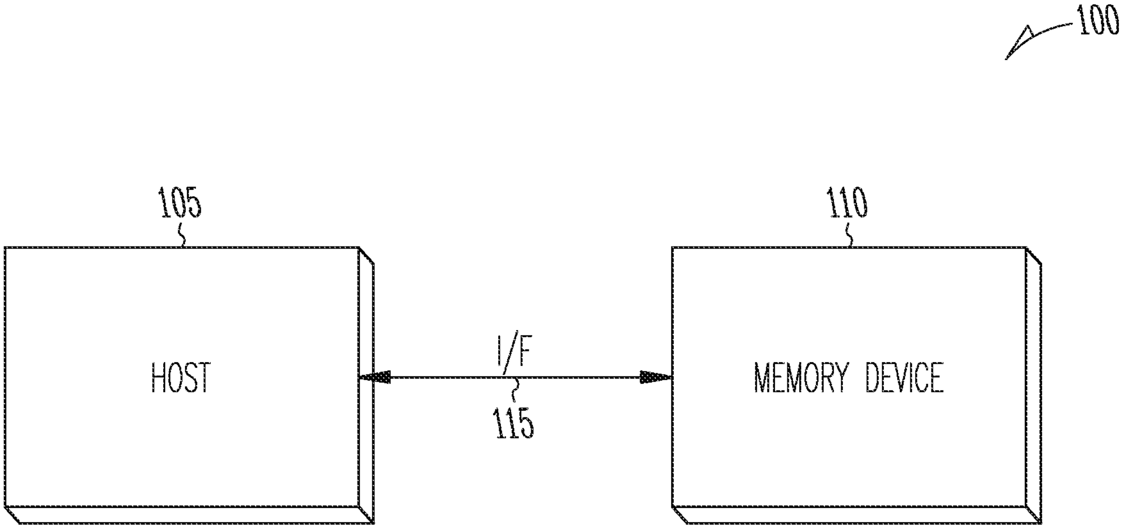
FIG. 1 illustrates an example system including a host and a memory device.

FIG. 1 illustrates an example system 100 including a host 105 and a memory device 110. The host 105 can include a host processor, a central processing unit, or one or more other device, processor, or controller. The memory device 110 can include a universal flash storage (UFS) device, an embedded MMC (eMMC™) device, or one or more other memory devices. The host 105 and the memory device 110 can communicate using a communication interface (I/F) 115 (e.g., a bidirectional parallel or serial communication interface).

In an example, the memory device 110 can include a UFS device, and the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, the memory device 110 can include an eMMC™ device, and the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the memory device 110 can include one or more other memory devices, or the communication interface 115 can include one or more other interfaces, depending on the host 105 and the memory device 110. The identified standards are provided only as example environments in which the described methods and structures may be utilized; but such methods and structures may be utilized in a variety of environments outside of the identified standards (or of any actual or proposed standards).

Each of the host 105 and the memory device 110 can include a number of receiver or driver circuits configured to send or receive signals over the communication interface 115, or interface circuits, such as data control units, sampling circuits, or other intermedia circuits configured to process data to be communicated over, or otherwise process data received from the communication interface 115 for use by the host 105, the memory device 110, or one or more other circuits or devices.

The memory device 110 can include a memory array (e.g., one or more arrays of memory cells, such as a NAND flash memory array, or one or more other memory arrays), a memory control unit, and in certain examples, an interface circuit between the memory array and the memory control unit. In certain examples, the memory array can include a number of memory die, each having control logic separate from the memory control unit. The memory control unit can include an application specific integrated circuit (ASIC), a field programmable gate array (FPGA), or one or more other processing circuits arranged or programmed to manage data transfers or operations to, from, or within the memory array.

Figure 2:
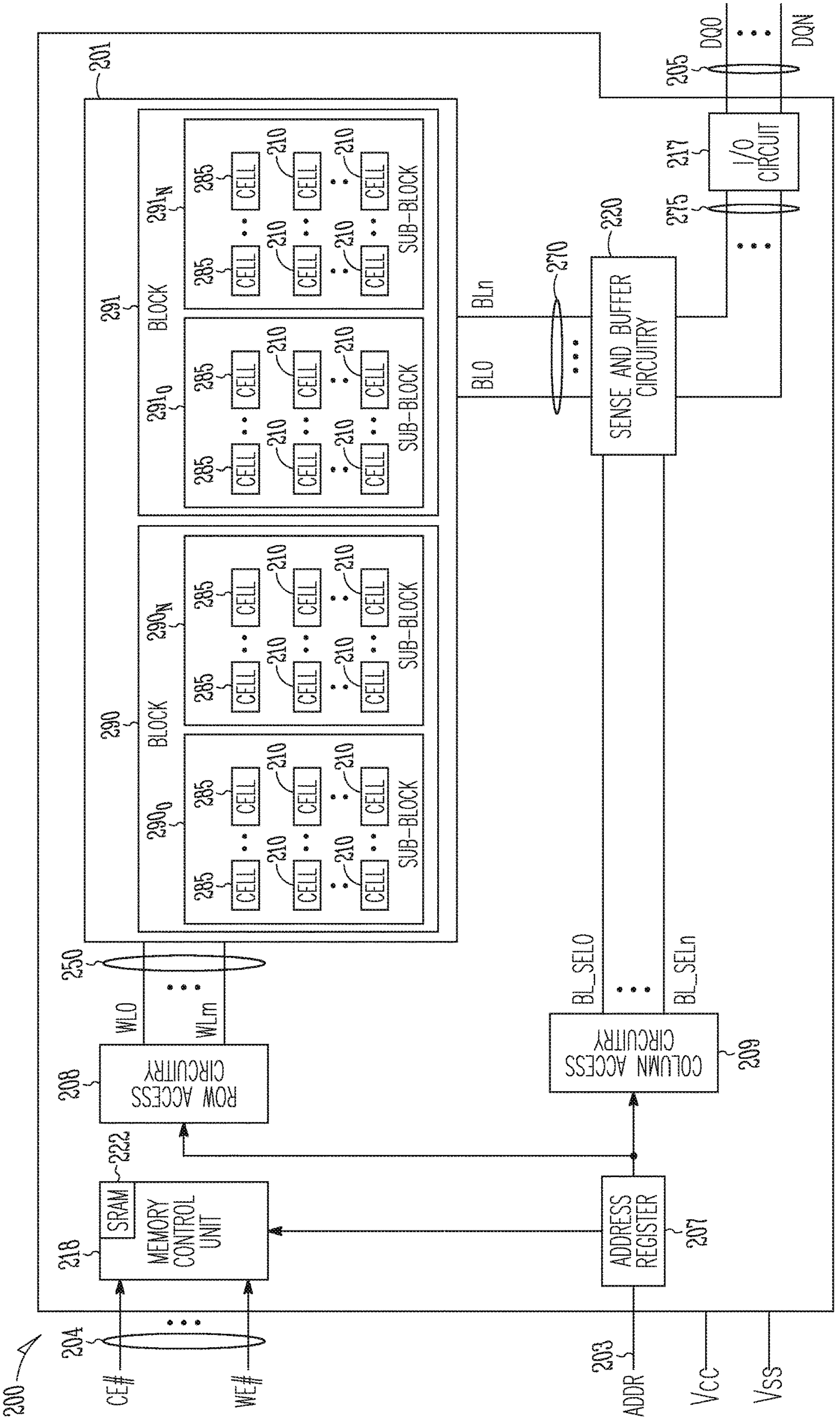
FIG. 2 is a block diagram of an apparatus in the form of a memory device including non-volatile memory cells.

FIG. 2 shows a block diagram of an apparatus in the form of a memory device 200 (e.g., memory device 110 in FIG. 1) including non-volatile memory cells having mixed memory cell types integrated in the same integrated circuit (IC) chip, according to some examples described herein. Memory device 200 can include a memory array (or multiple memory arrays) 201 containing memory cells 210 and 285. In the physical structure of memory device 200, memory cells 210 and 285 can be arranged vertically (e.g., stacked over each other) over a substrate of memory device 200 (e.g., a semiconductor substrate of an IC chip that includes memory device 200). Memory cells 210 and 285 can include non-volatile cells. Memory cells 210 and 285 can have different non-volatile memory cell types. For example, memory cells 210 can include floating gate memory cells, charge trap memory cells, or other types of non-volatile memory cells. Memory cells 285 can include ferroelectric memory cells, phase change memory cells, resistive memory cells, conduction bridge memory cells, SRAM memory cells, and spin-transfer-torque magnetic random access memory (SIT-MRAM) cells, or other types of non-volatile memory cells.

As shown in FIG. 2, memory cells 210 and 285 can be arranged in blocks (memory cell blocks), such as blocks 290 and 291. Each of blocks 290 and 291 can include sub-blocks. For example, block 290 can include sub-blocks $\mathbf{290}_0$ and $\mathbf{290}_n$, and block 291 can include sub-blocks $\mathbf{291}_0$ and $\mathbf{291}_n$. Each of sub-blocks $\mathbf{290}_0$, $\mathbf{290}_n$, $\mathbf{291}_0$, and $\mathbf{291}_n$ can include a combination of memory cells 210 and 285. FIG. 2 shows memory device 200 having two blocks 290 and 291 and two sub-blocks in each of the blocks as an example. Memory device 200 can have more than two blocks and more than two sub-blocks in each of the blocks.

As shown in FIG. 2, memory device 200 can include access lines (which can include word lines) 250 and data lines (which can include bit lines) 270. Access lines 250 can carry signals (e.g., word line signals) WL0 through WLm. Data lines 270 can carry signals (e.g., bit line signals) BL0 through BLn. Memory device 200 can use access lines 250 to selectively access sub-blocks $\mathbf{290}_0$, $\mathbf{290}_n$, $\mathbf{291}_0$, and $\mathbf{291}_n$ of blocks 290 and 291 and data lines 270 to selectively exchange information (e.g., data) with memory cells 210 of blocks 290 and 291.

Memory device 200 can include an address register 207 to receive address information (e.g., address signals) ADDR on lines (e.g., address lines) 203. Memory device 200 can include row access circuitry 208 and column access circuitry 209 that can decode address information from address register 207. Based on decoded address information, memory device 200 can determine which memory cells 210 of which sub-blocks of blocks 290 and 291 are to be accessed during a memory operation. Memory device 200 can perform a read operation to read (e.g., sense) information (e.g., previously stored information) in memory cells 210, or a write (e.g., program) operation to store (e.g., program) information in memory cells 210. Memory device 200 can use data lines 270 associated with signals BL0 through BLn to provide information to be stored in memory cells 210 or obtain information read (e.g., sensed) from memory cells 210. Memory device 200 can also perform an erase operation to erase information from some or all of memory cells 210 of blocks 290 and 291.

Memory device 200 can include a memory control unit 218 (which can include components such as a state machine (e.g., finite state machine), register circuits, and other components) configured to control memory operations (e.g., read, write, and erase operations) of memory device 200 based on control signals on lines 204. Examples of the control signals on lines 204 include one or more clock signals and other signals (e.g., a chip enable signal CE#, a write enable signal WE#) to indicate which operation (e.g., read, write, or erase operation) memory device 200 can perform.

Memory device 200 can include sense and buffer circuitry 220 that can include components such as sense amplifiers and page buffer circuits (e.g., data latches). Sense and buffer circuitry 220 can respond to signals BL_SEL0 through BL_SELn from column access circuitry 209. Sense and buffer circuitry 220 can be configured to determine (e.g., by sensing) the value of information read from memory cells 210 (e.g., during a read operation) of blocks 290 and 291 and provide the value of the information to lines (e.g., global data lines) 275. Sense and buffer circuitry 220 can also can be configured to use signals on lines 275 to determine the value of information to be stored (e.g., programmed) in memory cells 210 of blocks 290 and 291 (e.g., during a write operation) based on the values (e.g., voltage values) of signals on lines 275 (e.g., during a write operation).

Memory device 200 can include input/output (I/O) circuitry 217 to exchange information between memory cells 210 of blocks 290 and 291 and lines (e.g., I/O lines) 205. Signals DQ0 through DQN on lines 205 can represent information read from or stored in memory cells 210 of blocks 290 and 291. Lines 205 can include nodes within memory device 200 or pins (or solder balls) on a package where memory device 200 can reside. Other devices external to memory device 200 (e.g., a memory controller, memory control unit, or a processor) can communicate with memory device 200 through lines 203, 204, and 205.

Memory device 200 can receive a supply voltage, including supply voltages Vcc and Vss. Supply voltage Vss can operate at a ground potential (e.g., having a value of approximately zero volts). Supply voltage Vcc can include an external voltage supplied to memory device 200 from an external power source such as a battery or alternating current to direct current (AC-DC) converter circuitry.

Each of memory cells 210 can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell that can store more than one bit of data per cell (i.e., that can represent more than two programmed states).

In another example, each of memory cells 210 can be programmed to store information representing a value for multiple bits, such as one of four possible values "00", "01", "10", and "11" of two bits, one of eight possible values "000", "001", "010" "011", "100", "101", "110", and "111" of three bits, or one of other values of another number of multiple bits. A cell that has the ability to store multiple bits is sometimes called a multi-level cell (or multi-state cell).

Memory device 200 can include a non-volatile memory device, such that memory cells 210 and 285 can retain information stored thereon when power (e.g., voltage Vcc, Vss, or both) is disconnected from memory device 200. For example, memory device 200 can be a flash memory device, such as a NAND flash (e.g., 3-dimensional (3-D) NAND) or a NOR flash memory device, or another kind of memory device, such as a variable resistance memory device (e.g., a phase change memory device or a resistive RAM (Random Access Memory) device). One of ordinary skill in the art may recognize that memory device 200 may include other components not shown in FIG. 2 so as not to obscure the example embodiments described herein.

In memory device 200, memory cells 210 can be configured to store information (e.g., user data). Memory cells 285 may not be configured to permanently store information such as user information, but they may be used by memory device 200 as temporary storage cells (e.g., a buffer) during an operation (e.g., a write operation) of storing information (e.g., user data) in memory cells 210 in order to improve operations of memory device 200.

Figures 3A, 3B:
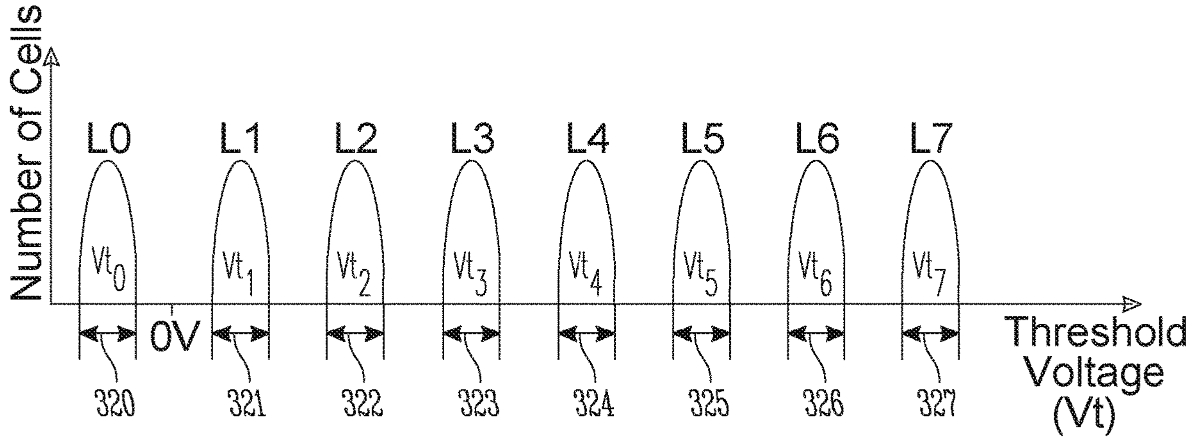
FIG. 3A is an illustration of an example of threshold voltage value distributions for memory cells.
FIG. 3B is an example chart showing threshold voltages and corresponding bit values.

FIG. 3A shows an example of threshold voltage value ranges 320 through 327 of corresponding threshold voltages $Vt_0$ through $Vt_7$ of memory cells 210 and 285 of memory device 200 of FIG. 2, according to some examples described herein. Each of memory cells 210 and 285 is configured to store more than one bit of information. FIG. 3A shows an example of threshold voltage value ranges 320 through 327 for memory cells configured to store three bits (e.g., bits B0, B1, and B2) of information. FIG. 3A shows eight levels (level 0 (L0) through level 7 (L7)) corresponding to eight different combinations of three bits. Level L0 can be called an erase level (e.g., erase state). Each of levels L0 through L7 has a threshold voltage value range for a large number of memory cells. Other numbers of bits and levels can be used in the programming (e.g., two bits for four levels, or four bits for sixteen levels).

Each of threshold voltages $Vt_0$ through $Vt_7$ has a value (analog voltage value) within a corresponding threshold voltage value range. For example, threshold voltage $Vt_1$ can be any value (a positive voltage value in volt unit) within threshold voltage value range 321, and threshold voltage $Vt_7$ can be any value (a positive voltage value in volt unit) within threshold voltage value range 327.

As shown in FIG. 3A, the values of threshold voltages $Vt_0$ through $Vt_7$ can go from a value within a lowest value range (threshold voltage value range 320 corresponding to level L0) to a value within a highest threshold voltage value range (threshold voltage value range 327 corresponding to level L7). Thus, the value of threshold voltage $Vt_7$ is greatest among the values of threshold voltages $Vt_0$ through $Vt_7$. The value of each of threshold voltage $Vt_0$ through $Vt_7$ can be used to represent a value (binary value) of a combination of three bits of information. L0 can be considered as an erase level.

FIG. 3B is an example chart (e.g., a table) showing threshold voltages $Vt_0$ through $Vt_7$ (eight different threshold voltages) and corresponding values (eight combinations of binary values) of three bits B0, B1, and B2 according to some examples described herein. For example, the values (e.g., in volt units) of threshold voltages $Vt_0$ through $Vt_7$ can be used to represent values (binary values) 000, 001, 010, 011, 100, 101, 110, and 111, respectively, of bits B0, B1, and B2. FIG. 3B shows the values of threshold voltages $Vt_0$ through $Vt_7$ being assigned to (e.g., mapped to) values (000 through 111) of bits B0, B1, and B2 in a sequential order (sequentially from a lower binary value to a higher binary value), as an example. However, the values of threshold voltages $Vt_0$ through $Vt_7$ can be assigned to values of bits B0, B1, and B2 in any order (e.g., non-sequential order). Based on the chart in FIG. 3B, during a write operation, the target value (analog value) for the threshold voltage of a selected memory cell (one of memory cells 210 and 285 in FIG. 2) is based on the value (binary value) of bits B0, B1, and B3 to be stored in that selected memory cell. For example, if three bits (B0, B1, and B2) having a value binary value of "100" are to be stored in the selected memory, then memory device 100 can cause (e.g., program) the threshold voltage of that selected memory cell to be the value of threshold voltage $Vt_4$ ("100"=$Vt_4$ based on the chart in FIG. 3B).

Returning to in FIG. 2, the memory control unit 218 may load a page of data to be programmed in the sense and buffer circuitry 220. The programming algorithm performed by a processor (e.g., a microprocessor) of the memory control unit 218 may begin with programming the memory cells to be written to L0 in an erase cycle. Memory cells can be written one memory page at a time or multiple memory pages at a time. Successive programming passes can be used to program the memory cells with data. The first pass may program all the bits to be programmed to L1 (or $Vt_1$). The programming, or placing, of all the L1 bits can be verified before moving on to the L2 bits. For memory cells for which programming to $Vt_1$ could not be verified, the memory controller may try to place an increased $Vt_1$ in these memory cells. This change in $Vt_1$ plus the variation in the memory cells can produce the threshold voltage range of $Vt_1$ shown in FIG. 3A. Programming or placement of the threshold voltage in the cells then progresses through placing the L2 through L7 threshold levels to complete programming the memory cells.

Figure 4:
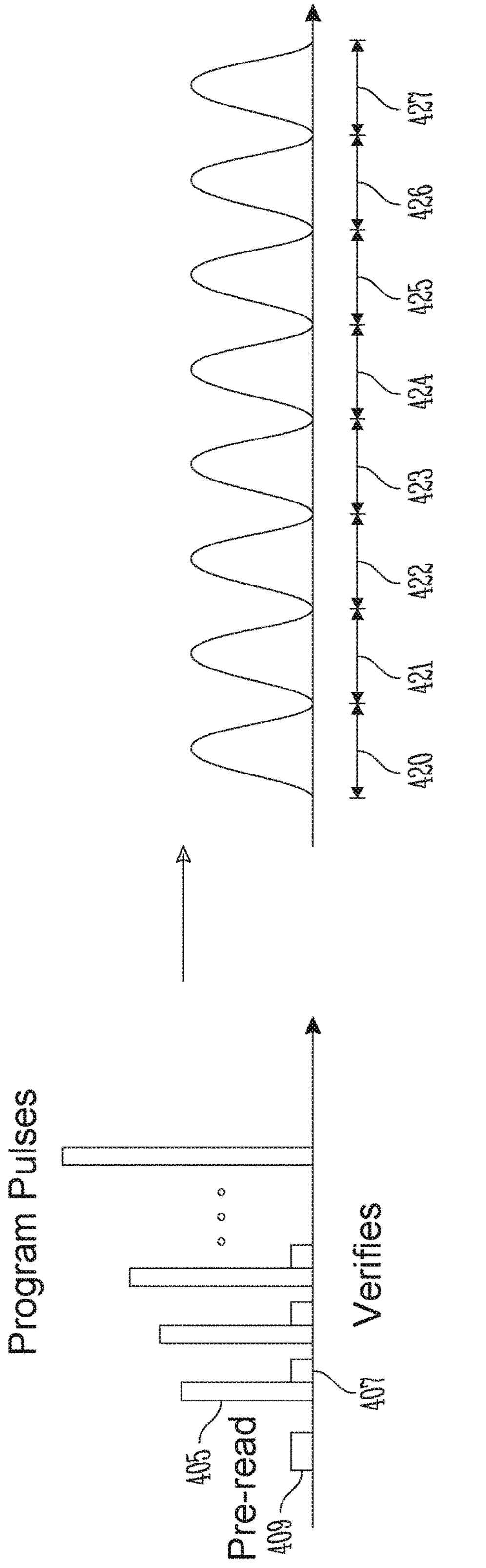
FIG. 4 is an illustration of a programming pass of a memory programming algorithm performed by a memory control unit.

FIG. 4 is an illustration of a programming pass of a memory programming algorithm performed by the memory control unit to place eight voltage thresholds in multi-level memory cells (MLCs). The user data in bits B2, B1, and B0 are used to program the memory cells to eight levels. The programming algorithm may include a Pre-Read operation 409. The eight levels 420 through 427 are placed using programming pulses 405 and verify operations 407 as art of the MLC programming algorithm. An SLC programming algorithm is used to program the memory cells to two levels.

Returning to FIG. 2, each of memory cells 210 can be programmed individually or collectively as SLCs (programmed to one of two programmed states) or MLCs (programmed to one of more than two programmed states, e.g., TLCs). In some embodiments, the host device controls what host data is written to SLCs and what host data is written to MLCs. The memory device may receive two data streams from the host device; one for SLC data and one for MLC data. The firmware of the memory control unit 218 may maintain two active cursors, one for each of the data streams. A cursor may be a pointer to an open block of memory, such as NAND memory in memory cells of the memory array.

Each cursor may use a dedicated write buffer to store data in transit between the host and the memory cells. In an example, the write buffer may be a separate memory 222 (e.g., SRAM) in memory control unit 218. For better performance, the size of the write buffer should match the maximum NAND memory program size. For example, if the MLC data is TLC data and with 16 parallel planes and 16 kilobytes (16 kB) of data per page, the SLC cursor needs 256 kB, while for single pass TLC programming in which three pages per plane are written at one time, the TLC cursor needs 756 kB. However, SRAM for a write buffer can be limited in the memory control unit 218 and adding additional SRAM can increase the cost of the memory control unit 218.

Figure 5:
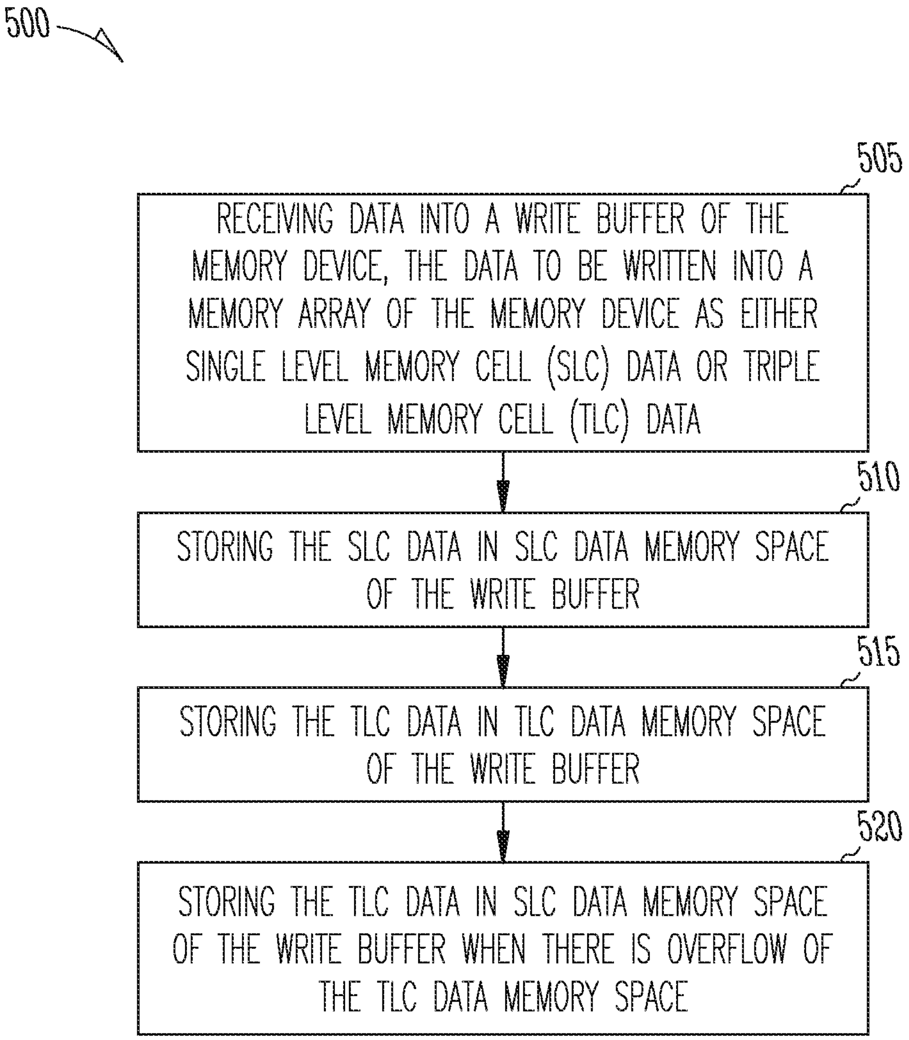
FIG. 5 is a flow diagram of a method of operating a memory device.

An approach to save on hardware resources is to share the write buffer between the SLC cursor and the MLC cursor. FIG. 5 is a flow diagram of a method 500 of operating a memory device. At 505, data is received into a write buffer of the memory device (e.g., memory 222 in memory control unit 218 of FIG. 2). The data is to be written into a memory array 201 of the memory device as either single level memory cell SLC data or triple level memory cell (TLC) data (or other MLC data). At 510, the SLC data is stored in SLC data memory space of the write buffer. At 515, the TLC data is stored in TLC data memory space of the write buffer. At 520, the TLC data is stored in SLC data memory space of the write buffer when there is overflow of the TLC data memory space. This allows both an SLC data stream and a TLC data stream (or other MLC data stream) from the host device to coexist at the same time. The memory control unit 218 may flush the SLC data memory space to the memory array 201 when the SLC data memory space is full. If the SLC memory space also contains TLC data, the memory control unit may also flush the TLC data memory space to the memory array. In variations, the memory control unit 218 flushes the write buffer to the memory array when the write buffer is full.

Figure 6:
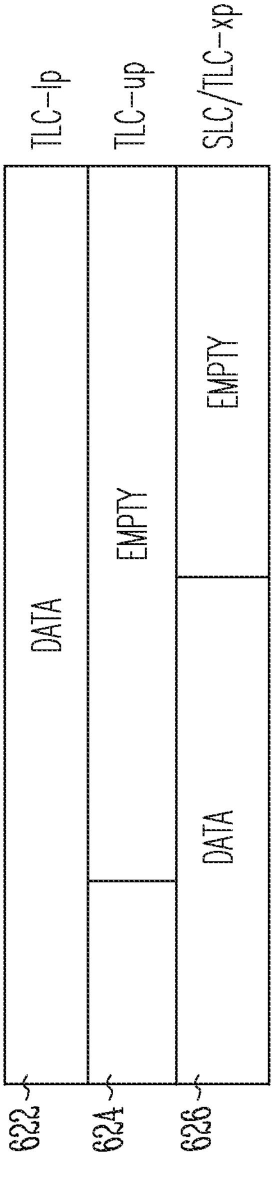
FIG. 6 is a block diagram of an example of a write buffer.

FIG. 6 is a block diagram of an example of a write buffer 622. The write buffer 622 can be implemented with SRAM or other volatile and non-volatile memory types. The write buffer includes TLC memory space for TLC data 624 (or other MLC memory space, such as QLC memory space for QLC data) and SLC memory space for SLC data 626. The TLC data and the SLC data are to be written from the write buffer to a memory array, such as a flash NAND memory array. A processor of memory control unit 218 in FIG. 2 may perform a first programming algorithm to program the memory cells of the memory array with the SLC data and perform a second programming algorithm to program the memory cells of the memory array with the TLC data.

The size of the write buffer may match the maximum NAND program size (e.g., 16 planes in parallel and 16 kilobytes (kB) per page). The write buffer 322 can include three memory pages; a TLC lower memory page (TLC-lp), a TLC upper memory page (TLC-up), and an SLC memory page or extra memory page. When there is overflow of the TLC memory space (e.g., TLC-lp and TLC-up), TLC data is stored in the SLC memory page. Thus, the SLC portion of the write buffer and the last portion of the TLC buffer overlap. For this reason, the SLC memory page is labeled "SLC/TLC-xp" in FIG. 6.

The memory control unit may flush the write buffer 622 to the memory array when the write buffer is full. In some examples, the memory control unit flushes only the SLC memory page to the memory array when the SLC memory page is full. If the SLC memory page includes TLC data, the processor of the memory control unit performs both the programming algorithm to program the SLC data and the programming algorithm to program the TLC data when flushing the SLC memory page to the memory array.

Figure 7:
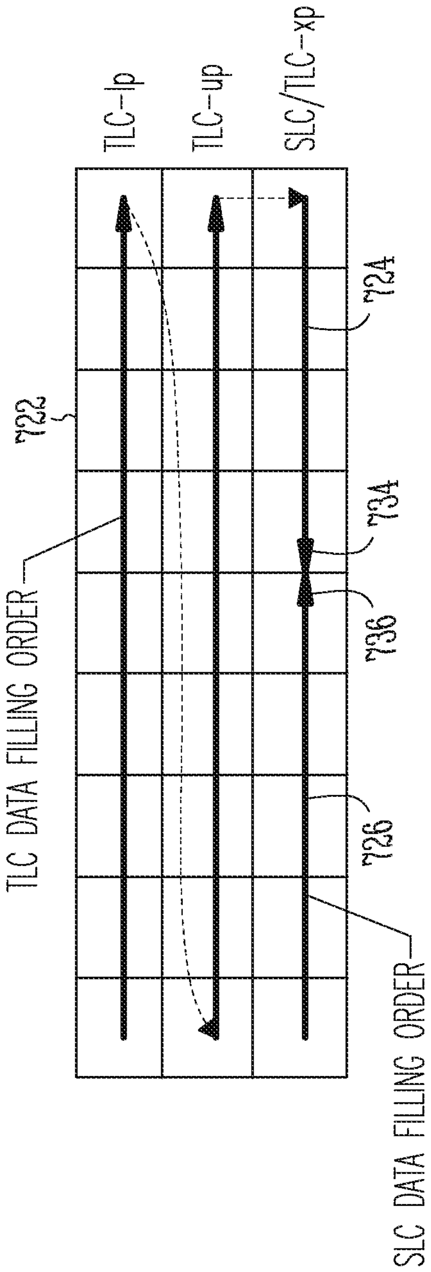
FIG. 7 is a block diagram of another example of a write buffer.

FIG. 7 is a block diagram of another example of a write buffer 722. To fill the buffer, the memory control unit implements two pointers or cursors. The memory control unit may maintain (e.g., using firmware) a TLC pointer 734 to index into the TLC lower memory page and TLC upper memory page and maintain an SLC pointer 736 to index into the SLC memory page. The TLC pointer 734 may index into the SLC memory page when there is overflow of the TLC data 724 in the TLC memory space. Mixing of the TLC data 724 and SLC data 726 may only be necessary when the data in the TLC memory space exceeds its quota (e.g., exceeds two pages of the three-page write buffer in the examples of FIGS. 6 and 7).

Figure 8:
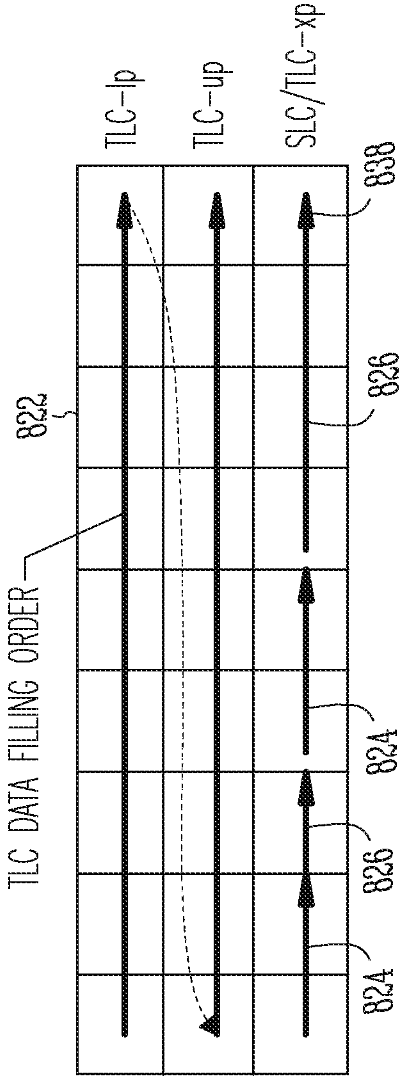
FIG. 8 is a block diagram of another example of a write buffer.

FIG. 8 is a block diagram of another example of a write buffer 822. To fill the SLC portion of the write buffer 822, the memory control unit uses only one shared pointer 838. When the TLC data 824 overflows into the SLC memory space, the shared pointer 838 advances when either TLC data 824 or SLC data 826 are placed in the memory space. The memory control unit 218 of FIG. 2 may reorganize the write buffer data (e.g., change the order of the TLC data and SLC data) when transferring the data to the memory array. Regardless of the filling implementation, the memory controller can always track the amount of data placed in the shared buffer belonging to the SLC stream and the amount of data belonging to the TLC stream. Write data may be flushed from the write buffer to the memory array based on the fill level of the write buffer and other consideration about the kind of data present in the buffer.

Figure 9:
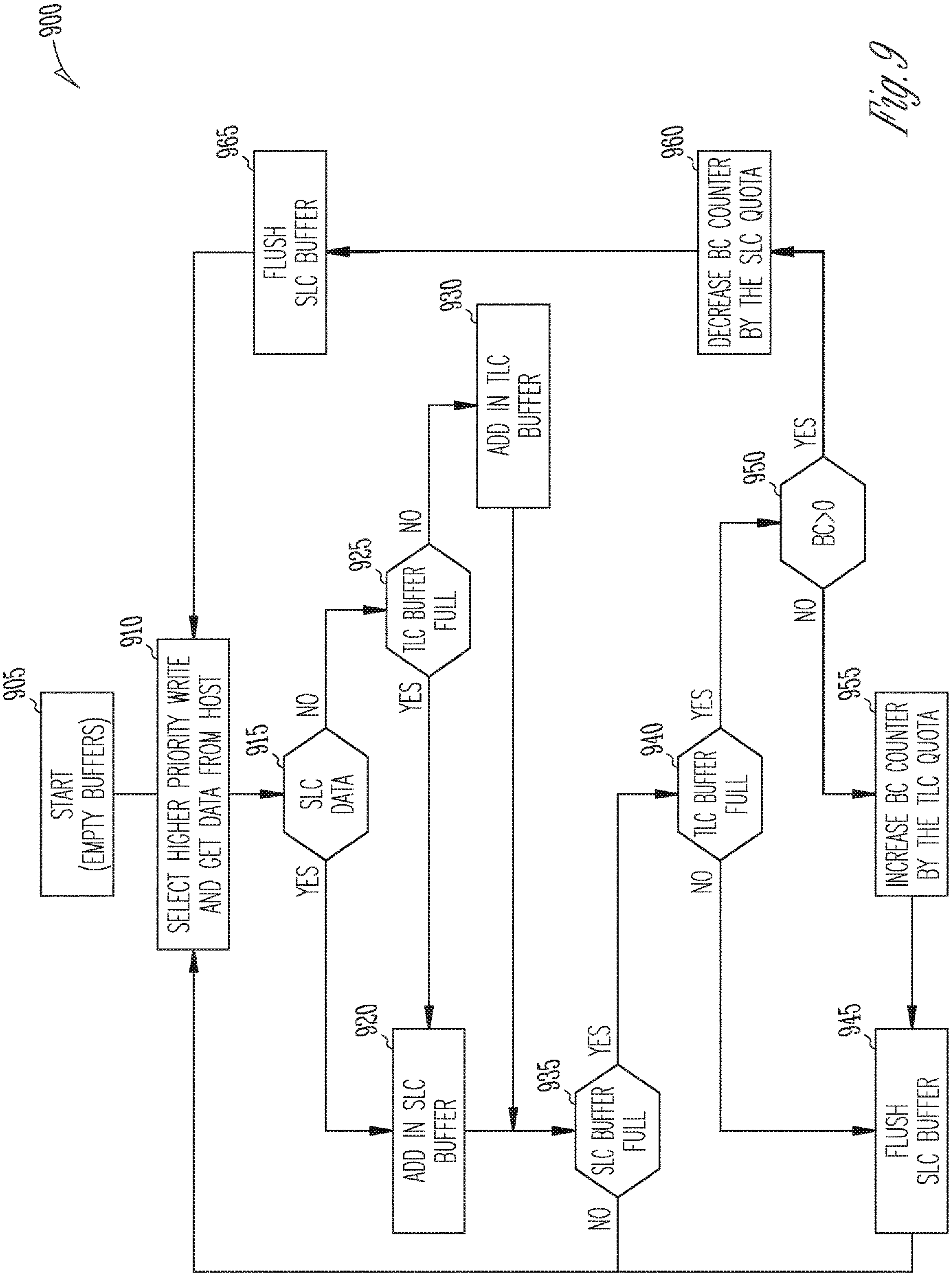
FIG. 9 is a flow diagram of another example of a method of operating a memory device.

FIG. 9 is a flow diagram of an example of a method 900 of operating a memory device to receive write data into a write buffer of a memory device and a flushing algorithm to transfer data from the write buffer to a memory array of the memory device. In the example of FIG. 9, "TLC Buffer" refers to the TLC specific portion of the write buffer and "SLC Buffer" refers to the shared SLC/TLC portion. The method begins at 905 with both the TLC Buffer and the SLC Buffer empty. At 910, the memory control unit of the memory device gets write data from the host device. At 915, the write data received from the host device is identified as either SLC data or TLC data. At 920, write data identified as SLC data is stored in the SLC data memory page of the write buffer. At 925, it is determined if the TLC Buffer is full. If the TLC memory pages are not full, at 930 write data identified as TLC data is stored in the TLC Buffer. If the TLC memory pages are full, write data identified as TLC data is stored in the SLC Buffer or SLC memory page of the write buffer at 920.

At 935 it is determined if the SLC Buffer is full. If the SLC Buffer is not full, the method returns to 910 to receive more write data. If the SLC Buffer is full, at 940 it is determined if the TLC Buffer is full. If the TLC Buffer is not full and the SLC Buffer is full, at 945 the data of the SLC Buffer is flushed to the memory array. If both the TLC Buffer and the SLC Buffer are full, a borrowed count (BC) counter is checked at 950. The BC counter tracks the amount of TLC data flushed into the SLC block of the memory array (e.g., an SLC NAND block) and therefore the amount of borrowed space in the SLC block of the memory array. In an example, when the shared memory space of the write buffer (e.g., the SLC/TLC-xp page in FIG. 6) contains 16 kB of TLC data and the shared memory space is flushed to the SLC block, the BC counter increments by 16. While if the full buffer is flushed to the TLC block, the BC counter value is decreased by the quantity of data belonging to the SLC stream (in the example of 256 kB SLC buffer, the BC counter will be decreased by 240).

If the BC counter is less than or equal to zero, there is no TLC data presently in the SLC Buffer. The TLC data that would overflow the TLC Buffer will be added to the SLC Buffer. The BC counter is increased by the TLC quota (e.g., the number of bytes of TLC data) written to the SLC Buffer at 955. If the SLC Buffer is full, the TLC Buffer is full, and the BC counter is greater than zero, at 960 the BC counter is decreased by the SLC quota (e.g., the number TLC bytes in the SLC Buffer) that will be flushed, and at 965 the TLC Buffer is flushed to the memory array. It is to be noted that when the SLC Buffer is flushed to the memory array, both SLC and TLC data will be written to the memory array if the BC counter is greater than zero, indicating that there is TLC data in the SLC Buffer. Different programming algorithms are used to program the SLC data and the TLC data. In certain examples, the memory control unit may reorganize the mixed data for transfer to the memory array.

Sharing the SRAM write buffer between the SLC data stream and TLC data stream gives the impression of two separate buffers while minimizing actual hardware resources used. Allocation of the write buffer between data streams is balanced to maintain performance of write transfers of each data stream. Although the examples described herein use SLC data and TLC data, the write buffer examples may store different combinations of data. For instance, the write buffer may hold TLC data and 2 bit-per-cell data. The TLC data may be allocated two memory pages and the 2 bit-per-cell data allocated one memory page (as with the SLC data), or the 2 bit-per-cell data may be allocated two memory pages and the TLC data allocated one memory page that overlaps with the 2 bit-per-cell data. In further examples, the write buffer stores data for more than two data streams (e.g., SLC data, 2 bit-per-cell data, and TLC data).

In another example, the write buffer may hold SLC data and QLC data for transfer to the memory array. In variations, the QLC programming can be done in two steps. In the first step, two pages of QLC data are used to program or place QLC data in four distributions in QLC cells of the memory array. In the second step, two memory pages are used to form 16 distributions in the QLC cells by splitting each of the first four distributions into four more distributions. One of the memory pages used to program the QLC data may be the memory page shared with the SLC data. In this case, only two pages may be needed in the write buffer with one of memory pages a mixed SLC/QLC memory page.

Figure 10:
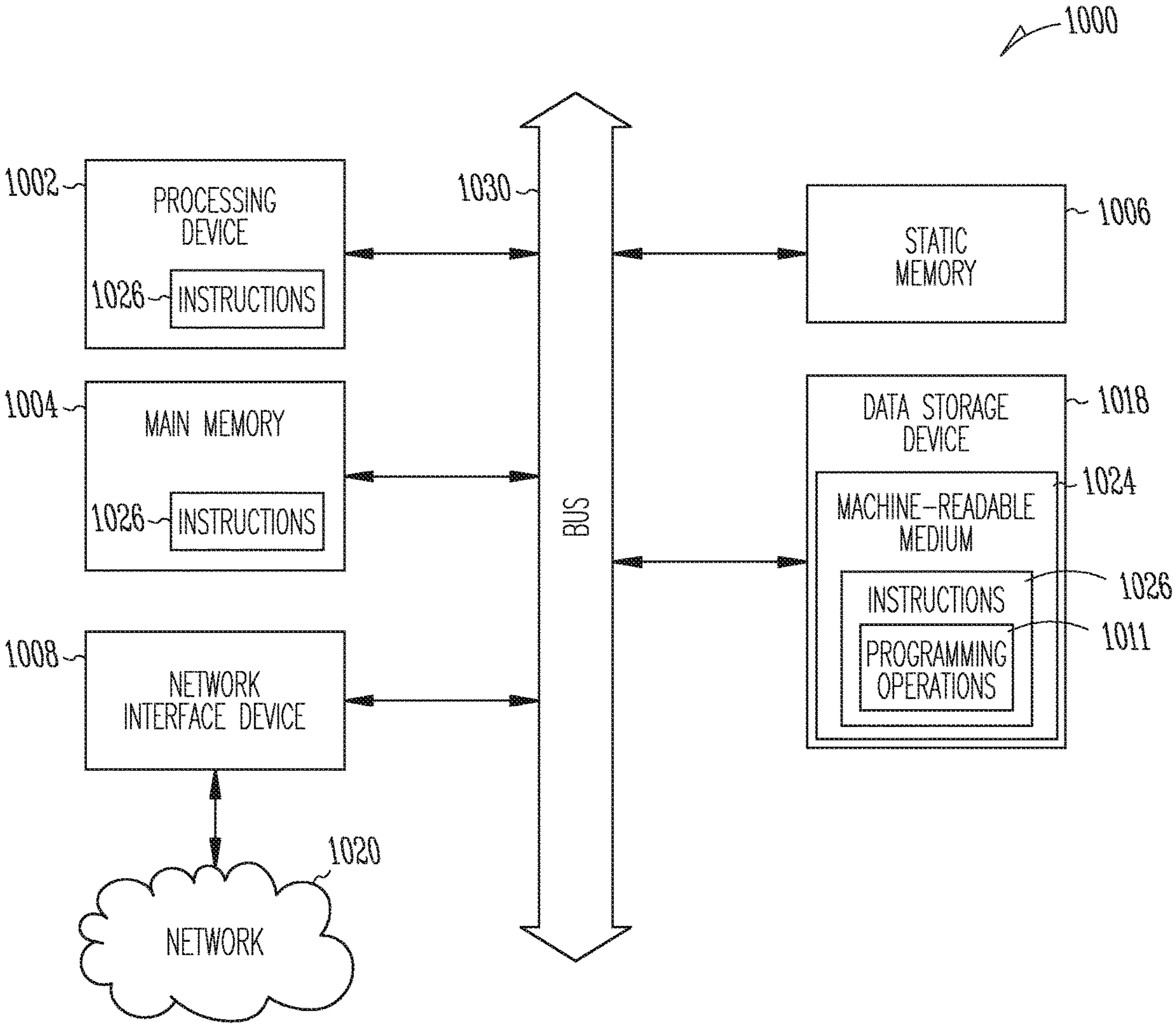
FIG. 10 is a block diagram of an example machine according to some examples described herein.

FIG. 10 illustrates a block diagram of an example machine 1000 upon which any one or more of the techniques (e.g., methodologies) discussed herein may perform, such as the described write buffer operations for simultaneous SLC and TLC data streams for example. The machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The embodiments and examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1000 (e.g., the host 105, the memory device 110 of FIG. 1, etc.) may include a processing device 1002 (e.g., a hardware processor, a central processing unit (CPU), a graphics processing unit (GPU), a hardware processor core, or any combination thereof, such as a memory control unit of the memory device 110 of FIG. 1, etc.), a main memory 1004 (e.g., read-only memory (ROM), flash memory, dynamic random-access memory (DRAM) such as synchronous DRAM (SDRAM) or Rambus DRAM (RDRAM), etc.), a static memory 1006 (e.g., flash memory, static random-access memory (SRAM), etc.), and a data storage system 1018, some or all of which may communicate with each other via an interlink (e.g., bus) 1030.

The processing device 1002 can represent one or more general-purpose processing devices such as a microprocessor, a central processing unit, or the like. More particularly, the processing device 1002 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 1002 can also be one or more special-purpose processing devices such as an application specific integrated circuit (ASIC), a field programmable gate array (FPGA), a digital signal processor (DSP), network processor, or the like. The processing device 1002 can be configured to execute instructions 1026 for performing the operations and steps discussed herein. The machine 1000 can further include a network interface device 1008 to communicate over a network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 or within the processing device 1002 during execution thereof by the machine 1000, the main memory 1004 and the processing device 1002 also constituting machine-readable storage media. The machine-readable storage medium 1024, the data storage system 1018, or the main memory 1004 can correspond to the memory device 110 of FIG. 1. In one implementation, the instructions 1026 include instructions 1011 to implement functionality corresponding to multiple programming operations (e.g., the programming algorithms to program both single level memory cells and multiple level memory cells).

While the machine-readable storage medium 1024 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 1000 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 1000 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 1026 (e.g., software, programs, an operating system (OS), etc.) or other data are stored on the data storage device 1018 can be accessed by the main memory 1004 for use by the processing device 1002. The main memory 1004 (e.g., DRAM) is typically fast, but volatile, and thus a different type of storage than the data storage device 1018 (e.g., an SSD), which is suitable for long-term storage, including while in an "off" condition. The instructions 1026 or data in use by a user or the machine 1000 are typically loaded in the main memory 1004 for use by the processing device 1002. When the main memory 1004 is full, virtual space from the data storage device 1018 can be allocated to supplement the main memory 1004; however, because the data storage device 1018 device is typically slower than the main memory 1004, and write speeds are typically at least twice as slow as read speeds, use of virtual memory can greatly reduce user experience due to storage device latency (in contrast to the main memory 1004, e.g., DRAM). Further, use of the data storage device 1018 for virtual memory can greatly reduce the usable lifespan of the data storage device 1018.

In contrast to virtual memory, virtual memory compression (e.g., the Linux™ kernel feature "ZRAM") uses part of the memory as compressed block storage to avoid paging to the data storage device 1018. Paging takes place in the compressed block until it is necessary to write such data to the data storage device 1018. Virtual memory compression increases the usable size of the main memory 1004, while reducing wear on the data storage device 1018.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 1024 may further be transmitted or received over a network 1020 using a transmission medium via the network interface device 1008 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1008 may include one or more physical jacks (e.g., Ethernet, coaxial, or phone jacks) or one or more antennas to connect to the network 1020. In an example, the network interface device 1008 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, unless stated otherwise the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

ADDITIONAL DESCRIPTION AND EXAMPLES

Example 1 includes subject matter (such as a memory device) comprising a memory array including memory cells programmable as single level memory cells (SLCs) and memory cells programmable as triple level memory cells (TLCs); a memory control unit operatively coupled to the memory array and including a processor, the processor configured to program the memory cells with SLC data and TLC data; and a write buffer to buffer data for writing to the memory array, the write buffer including both SLC data memory space and TLC data memory space, wherein the memory control unit is configured to store the TLC data in the SLC data memory space when there is overflow of the TLC data memory space.

In Example 2, the subject matter of Example 1 optionally includes TLC memory space including a TLC lower memory page and a TLC upper memory page; the SLC memory space includes an SLC memory page, and wherein the memory controller is configured to store the TLC data in the SLC memory page when there is overflow of the TLC data in the TLC memory space.

In Example 3, the subject matter of Example 2 optionally includes a processor configured to index into the SLC memory page using an SLC pointer; index into the TLC lower memory page and the TLC upper memory page using a TLC pointer; and index into the SLC memory page using the TLC pointer when there is overflow of the TLC data in the TLC memory space.

In Example 4, the subject matter of Example 2 optionally includes a processor configured to implement a shared pointer to index the TLC data in the upper memory page, the TLC data in the lower TLC memory page, and the SLC data in the SLC memory page; and wherein the shared pointer indexes to both TLC data and SLC data in the SLC memory page when there is overflow of the TLC data in the TLC memory space.

In Example 5, the subject matter of one or any combination of Examples 1-4 optionally includes a processor configured to track an amount of TLC data written from the SLC data memory space of the write buffer to an SLC block of the memory array using a borrowed count (BC) counter.

In Example 6, the subject matter of one or any combination of Examples 1-5 optionally includes a processor configured to write data stored in the SLC data memory space of the write buffer to the memory array when the SLC data memory space is full. The writing of data including performing a first programming algorithm to program the memory cells with the SLC data stored in the SLC data memory space; and performing a second programming algorithm to program the memory cells with the TLC data stored in the SLC data memory space.

In Example 7, the subject matter of one or any combination of Examples 1-6 optionally includes a memory array including flash NAND memory cells, and a write buffer including static random access memory (SRAM) cells.

Example 8 includes subject matter (such as method of operating a memory device) or can optionally be combined with one or any combination of Examples 1-7 to include such subject matter, comprising receiving data into a write buffer of the memory device, the data to be written into a memory array of the memory device as either single level memory cell (SLC) data or multiple level memory cell (MLC) data including two or more bits of data per memory cell; storing the SLC data in SLC data memory space of the write buffer; storing the MLC data in MLC data memory space of the write buffer; and storing the MLC data in SLC data memory space of the write buffer when there is overflow of the MLC data memory space.

In Example 9, the subject matter of Example 8 optionally includes storing the SLC data in an SLC memory page of the write buffer; storing the MLC data in a lower MLC memory page and an upper MLC memory page of the write buffer; and storing the MLC data in the SLC memory page when there is overflow of the MLC data in the MLC data memory space.

In Example 10, the subject matter of one or both of Examples 8 and 9 optionally includes implementing a MLC pointer to index into the MLC data memory space and an SLC pointer to index into the SLC data memory space, and the MLC pointer indexes into the SLC memory space when there is overflow of the MLC data in the MLC memory space.

In Example 11, the subject matter of one or both of Examples 8 and 9 optionally includes implementing a shared pointer to both index MLC data into the MLC data memory space and index SLC data into the SLC data memory space, and to index to both the MLC data and the SLC data in the SLC memory space when there is overflow of the MLC data in the MLC memory space.

In Example 12, the subject matter of one or any combination of Examples 8-11 optionally includes identifying the received data as either MLC data or SLC data; storing identified SLC data in an SLC data memory page of the write buffer; storing identified MLC data in one or more MLC data memory pages of the write buffer when the MLC data memory pages are not full; and storing the identified MLC data in the SLC data memory page of the write buffer when the MLC data memory pages are full.

In Example 13, the subject matter of Example 12 optionally includes writing data stored in the SLC data memory page to the memory array when the SLC data memory page is full and the one or more MLC data memory pages are not full; and updating a borrowed count (BC) counter when the SLC data memory page is full and the one or more MLC data memory pages are full. Updating the BC counter includes increasing the BC counter by an amount of MLC data in the SLC data memory page when the BC counter is greater than zero and writing the data stored in the SLC data memory page to the memory array; and decreasing the BC counter by an amount of SLC data in the SLC data memory page when the BC is less than or equal to zero and writing the data stored in the one or more MLC data memory pages to the memory array.

In Example 14, the subject matter of one or any combination of Examples 8-13 optionally includes writing data in the SLC memory space of the write buffer to the memory array when the SLC memory space is full. Writing the data in the SLC memory space of the write buffer includes performing a first programming algorithm to program memory cells of the memory array with the SLC data stored in the SLC memory space of the write buffer; and performing a second programming algorithm to program memory cells of the memory array with the MLC data stored in the SLC data memory space.

Example 15 includes subject matter (such as a computer readable storage medium) or can optionally be combined with one or any combination of Examples 1-14 to include such subject matter, comprising instructions to instructions configured to cause a memory control unit of a memory device to: receive data into a write buffer of the memory device, the data to be written into a memory array of the memory device as either single level memory cell (SLC) data or triple level memory cell (TLC) data; store the SLC data in SLC data memory space of the write buffer; store the TLC data in TLC data memory space of the write buffer; and store the TLC data in SLC data memory space of the write buffer when there is overflow of the TLC data memory space. The computer readable storage medium may be non-transitory or transitory such as a propagating signal.

In Example 16, the subject matter of Example 15 optionally includes instructions to cause the memory control unit to: store the SLC data in an SLC memory page of the write buffer; store the TLC data in a TLC lower memory page and a TLC upper memory page of the write buffer; and store the TLC data in the SLC memory page when there is overflow of the TLC data in the TLC data memory space.

In Example 17, the subject matter of one or both of Examples 15 and 16 optionally includes instructions to cause the memory control unit to implement an SLC pointer to index into the SLC data memory space and implement a TLC pointer to index into the TLC data memory space and to index into the SLC memory page when there is overflow of the TLC data in the TLC memory space.

In Example 18, the subject matter of one or both of Examples 15 and 16 optionally includes instructions to cause the memory control unit to implement a shared pointer to both index TLC data into the TLC data memory space and index SLC data into the SLC data memory space, and to index to both the TLC data and the SLC data in the SLC memory page when there is overflow of the TLC data in the TLC memory space.

In Example 19, the subject matter of one or any combination of Examples 15-18 optionally includes instructions to cause the memory control unit to: identify the received data as either TLC data or SLC data; store identified SLC data in an SLC data memory page of the write buffer; store identified TLC data in one or more TLC data memory pages of the write buffer when the TLC data memory pages are not full; and store the identified TLC data in the SLC data memory page of the write buffer when the TLC data memory pages are full.

In Example 20, the subject matter of Example 19 optionally includes instructions to cause the memory control unit to: write data stored in the SLC data memory page to the memory array when the SLC data memory page is full and the one or more TLC data memory pages are not full; and update a borrowed count (BC) counter when the SLC data memory page is full and the one or more TLC data memory pages are full. The updating the BC counter can include increasing the BC counter by an amount of TLC data in the SLC data memory page when the BC counter is less than or equal to zero and write the data stored in the SLC data memory page to the memory array, and decreasing the BC counter by an amount of SLC data in the SLC data memory page when the BC is greater than zero and write the data stored in the one or more TLC data memory pages to the memory array.

In Example 21, the subject matter of one or any combination of Examples 15-20 optionally includes instructions to cause the memory control unit to write data stored in the SLC memory space of the write buffer to the memory array when the SLC memory space is full. The writing the data stored in the SLC memory space of the write buffer can include performing a first programming algorithm to program memory cells of the memory array with the SLC data stored in the SLC memory space of the write buffer; and performing a second programming algorithm to program memory cells of the memory array with the TLC data stored in the SLC data memory space.

In Example 22, any of the memory devices of Examples 1-7 may be adapted and operated to perform operations in accordance with any of the methods of Examples 8-14.

In Example 23, any of the memory devices of Examples 1-7 may be incorporated into an electronic system further comprising a host processor and a communication bus extending between the host processor and the memory device.

In Example 24, any of the memory devices of examples 1-7 may be modified to include any structure presented in another of Examples 1-7.

In Example 25, any of the methods of Examples 8-14 may be performed by an electronic system including a host processor and a communications bus extending between the host processor and a memory device.

In Example 26, any of the methods of Examples 8-14 may be modified to include operations set forth in any other of Examples 8-14.

In Example 27, any of the methods of Examples 8-14 may be implemented at least in part through use of instructions stored as a physical state in one or more of the machine-readable storage devices of any of Examples 15-21.

In Example 28, any of the memory devices of Examples 1-7 may further include a machine-readable storage device of any of Examples 15-21 configured to store instructions as a physical state, wherein the instructions may be used to perform one or more operations of the memory device.

These non-limiting examples can be combined in any permutation or combination. The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A memory device comprising:

a memory array including memory cells programmable as single level memory cells (SLCs) and memory cells programmable as triple level memory cells (TLCs);

a memory control unit operatively coupled to the memory array and including a processor, the processor configured to program the memory cells with SLC data and TLC data; and a write buffer to buffer data for writing to the memory array, the write buffer including both SLC data memory space and TLC data memory space, wherein the memory control unit is configured to store the TLC data in the SLC data memory space when there is overflow of the TLC data memory space, wherein the overflow of the TLC data memory space occurs when the TLC data in the TLC data memory space exceeds its quota in the write buffer.

2. The memory device of claim 1, herein the TLC data memory space includes a TLC lower memory page and a TLC upper memory page; the SLC data memory space includes an SLC memory page, and wherein the memory controller is configured to store the TLC data in the SLC memory page when there is overflow of the TLC data in the TLC data memory space.

3. The memory device of claim 2, wherein the processor is configured to:

index into the SLC memory page using an SLC pointer;

index into the TLC lower memory page and the TLC upper memory page using a TLC pointer; and index into the SLC memory page using the TLC pointer when there is overflow of the TLC data in the TLC data memory space.

4. The memory device of claim 2, wherein the processor is configured to implement a shared pointer to index the TLC data in the upper memory page, the TLC data in the lower TLC memory page, and the SLC data in the SLC memory page; and wherein the shared pointer indexes to both TLC data and SLC data in the SLC memory page when there is overflow of the TLC data in the TLC data memory space.

5. The memory device of claim 1, wherein the processor is configured to track an amount of TLC data written from the SLC data memory space of the write buffer to an SLC block of the memory array using a borrowed count (BC) counter.

6. The memory device of claim 1, wherein the processor is configured to write data stored in the SLC data memory space of the write buffer to the memory array when the SLC data memory space is full, including:

perform a first programming algorithm to program the memory cells with the SLC data stored in the SLC data memory space; and perform a second programming algorithm to program the memory cells with the TLC data stored in the SLC data memory space.

7. The memory device of claim 1, wherein the memory cells of the memory array are flash NAND memory cells, and the write buffer includes static random access memory (SRAM) cells.

8. A method of operating a memory device, the method comprising:

receiving data into a write buffer of the memory device, the data to be written into a memory array of the memory device as either single level memory cell (SLC) data or multiple level memory cell (MLC) data including two or more bits of data per memory cell;

storing the SLC data in SLC data memory space of the write buffer;

storing the MLC data in MLC data memory space of the write buffer; and storing the MLC data in SLC data memory space of the write buffer when there is overflow of the MLC data memory space, wherein the overflow of the MLC data memory space occurs when the MLC data in the MLC data memory space exceeds its quota in the write buffer.

9. The method of claim 8, wherein storing the SLC data in the SLC data memory space includes storing the SLC data in an SLC memory page of the write buffer; and wherein storing the MLC data in the MLC data memory space includes storing the MLC data in a lower MLC memory page and an upper MLC memory page of the write buffer, and storing the MLC data in the SLC memory page when there is overflow of the MLC data in the MLC data memory space.

10. The method of claim 8, including:

implementing an MLC pointer to index into the MLC data memory space and an SLC pointer to index into the SLC data memory space, and the MLC pointer indexes into the SLC memory space when there is overflow of the MLC data in the MLC data memory space.

11. The method of claim 8, including:

implementing a shared pointer to both index MLC data into the MLC data memory space and index SLC data into the SLC data memory space, and to index to both the MLC data and the SLC data in the SLC memory space when there is overflow of the MLC data in the MLC data memory space.

12. The method of claim 8, including:

identifying the received data as either MLC data or SLC data;

storing identified SLC data in an SLC data memory page of the write buffer;

storing identified MLC data in one or more MLC data memory pages of the write buffer when the MLC data memory pages are not full; and storing the identified MLC data in the SLC data memory page of the write buffer when the MLC data memory pages are full.

13. The method of claim 12, including:

writing data stored in the SLC data memory page to the memory array when the SLC data memory page is full and the one or more MLC data memory pages are not full; and updating a borrowed count (BC) counter when the SLC data memory page is full and the one or more MLC data memory pages are full, including:

increasing the BC counter by an amount of MLC data in the SLC data memory page when the BC counter is greater than zero and writing the data stored in the SLC data memory page to the memory array; and decreasing the BC counter by an amount of SLC data in the SLC data memory page when the BC is less than or equal to zero and writing the data stored in the one or more MLC data mentor), pages to the memory array.

14. The method of claim 8, including writing data in the SLC memory space of the write buffer to the memory array when the SLC memory space is full, wherein writing the data includes:

performing a first programming algorithm to program memory cells of the memory array with the SLC data stored in the SLC data memory space of the write buffer; and performing a second programming algorithm to program memory cells of the memory array with the MLC data stored in the SLC data memory space.

15. A non-transitory computer readable storage medium comprising instructions configured to cause a memory control unit of a memory device to:

receive data into a write buffer of the memory device, the data to be written into a memory array of the memory device as either single level memory cell (SLC) data or triple level memory cell (TLC) data;

store the SLC data in SLC data memory space of the write buffer;

store the TLC data in TLC data memory space of the write buffer; and store the TLC data in SLC data memory space of the write buffer when there is overflow of the TLC data memory space, wherein the overflow of the TLC data memory space occurs when the TLC data in the TLC data memory space exceeds its quota in the write buffer.

16. The non-transitory computer readable storage medium of claim 15, including instructions to cause the memory control unit to:

store the SLC data in an SLC memory page of the write buffer;

store the TLC data in a TLC lower memory page and a TLC upper memory page of the write buffer; and store the TLC data in the SLC memory page when there is overflow of the TLC data in the TLC data memory space.

17. The non-transitory computer readable storage medium of claim 15, including instructions to cause the memory control unit to:

implement an SLC pointer to index into the SLC data memory space and implement a TLC pointer to index into the TLC data memory space and to index into the SLC memory page when there is overflow of the TLC data in the TLC data memory space.

18. The non-transitory computer readable storage medium of claim 15, including instructions to cause the memory control unit to:

implement a shared pointer to both index TLC data into the TLC data memory space and index SLC data into the SLC data memory space, and to index to both the TLC data and the SLC data in the SLC memory page when there is overflow of the TLC data in the TLC data memory space.

19. The non-transitory computer readable storage medium of claim 15, including instructions to cause the memory control unit to:

identify the received data as either TLC data or SLC data;

store identified SLC data in an SLC data memory page of the write buffer;

store identified TLC data in one or more TLC data memory pages of the write buffer when the TLC data memory pages are not full; and store the identified TLC data in the SLC data memory page of the write buffer when the TLC data memory pages are full.

20. The non-transitory computer readable storage medium of claim 19, including instructions to cause the memory control unit to:

write data stored in the SLC data memory page to the memory array when the SLC data memory page is full and the one or more TLC data memory pages are not full; and update a borrowed count (BC) counter when the SLC data memory page is full and the one or more TLC data memory pages are full, including:

increase the BC counter by an amount of TLC data in the SLC data memory page when the BC counter is less than or equal to zero and write the data stored in the SLC data memory page to the memory array; and decrease the BC counter by an amount of SLC data in the SLC data memory page when the BC is greater than zero and write the data stored in the one or more TI C data memory pages to the memory array.

21. The non-transitory computer readable storage medium of claim 15, including instructions to cause the memory control unit to write data stored in the SLC data memory space of the write buffer to the memory array when the SLC data memory space is full, wherein writing the data includes:

performing a first programming algorithm to program memory cells of the memory array with the SLC data stored in the SLC data memory space of the write buffer; and performing a second programming algorithm to program memory cells of the memory array with the TLC data stored in the SLC data memory space.

* * * * *

UNITED STATES PATENT AND TRADEMARK OFFICE

CERTIFICATE OF CORRECTION

PATENT NO. : 11,119,659 B2
APPLICATION NO. : 16/538426
DATED : September 14, 2021
INVENTOR(S) : Giuseppe Cariello It is certified that error appears in the above-identified patent and that said Letters Patent is hereby corrected as shown below:

In the Claims

In Column 18, Line 58, in Claim 2, delete "herein" and insert --wherein-- therefor In Column 20, Line 30, in Claim 13, delete "mentor)," and insert --memory-- therefor In Column 22, Line 16, in Claim 20, delete "TI C" and insert --TLC-- therefor Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*